United States Patent [19]
Otto

[11] Patent Number: 4,878,627
[45] Date of Patent: Nov. 7, 1989

[54] KITCHEN APPLIANCE

[75] Inventor: Friedrich Otto, Hameln, Fed. Rep. of Germany

[73] Assignee: A. Stephen u. Soehne GmbH & Co., Hameln, Fed. Rep. of Germany

[21] Appl. No.: 238,075

[22] Filed: Aug. 30, 1988

[51] Int. Cl.⁴ .......................... B01F 7/16; B02C 18/18
[52] U.S. Cl. ................................ 241/199.12; 99/348; 247/282.2; 366/205; 366/314; 366/343
[58] Field of Search .................... 99/348, 509, 510; 366/205, 279, 293, 314, 342, 343, 325, 327; 241/282.1, 282.2, 92, 199.12

[56] References Cited

U.S. PATENT DOCUMENTS

| | | | |
|---|---|---|---|
| 1,212,915 | 1/1917 | Daughtry | 241/92 X |
| 3,156,278 | 11/1964 | Otto | 241/282.2 |
| 4,101,978 | 7/1978 | Brackman | 366/314 |
| 4,124,310 | 11/1978 | Brackman et al. | 366/314 |
| 4,149,271 | 4/1979 | Uibel et al. | 366/314 |
| 4,557,605 | 12/1985 | Kenney et al. | 366/279 X |
| 4,609,156 | 9/1986 | Boele | 241/199.12 |
| 4,723,719 | 2/1988 | Williams | 241/282.2 |

Primary Examiner—Timothy F. Simone
Attorney, Agent, or Firm—Foley & Lardner, Schwartz, Jeffrey, Schwaab, Mack, Blumental & Evans

[57] ABSTRACT

A kitchen appliance for the mincing or shredding of cooked pieces of beef for the preparation of corned beef includes an upwardly open bowl of substantially round cross-section and an upwardly protruded tool shaft which extends centrally thorough a bottom portion of the bowl and can be driven at high speed by a power source underneath the bowl bottom. On the tool shaft there is fixed a chopping tool having radially outwardly extending blades. The blades are arranged at different relative heights.

15 Claims, 3 Drawing Sheets

KITCHEN APPLIANCE

BACKGROUND OF THE INVENTION

The invention relates to a kitchen appliance for the mincing or shredding of cooked pieces of beef for the preparation of corned beef.

In the United States in particular, meals (especially sandwiches) with corned beef are offered in fast-food restaurants. In relatively small restaurants, this corned beef is freshly prepared. Industrially produced corned beef is rarely used, in particular because only freshly prepared products are offered.

Basically available for the preparation of corned beef are vertical cutter mixers, which are offered by several companies on the U.S. market. However, the market requires a quite specific fibrous corned beef structure.

SUMMARY OF THE INVENTION

An object of this invention is to develop a tool which allows the vertical cutter mixers known to be used and with which the fibrous corned beef structure mentioned above can be achieved.

According to the invention, this object is achieved by an upwardly open bowl of substantially round cross-section with a bowl bottom, a perpendicularly upward protruding tool shaft, which is led centrally through the bowl bottom and can be driven at high speed by a motor arranged underneath the bowl bottom, and on the tool shaft there is fixed a chopping tool having four radially outwardly extending blades mutually offset at 90° of circumference in each case, which in plan view form a cross.

The blades are in each case arranged at a different axial height, the lowest blade revolving directly above the bowl bottom and the highest blade revolving at approximately three-fourths of the bowl height. Each blade has a constant flatly rectangular cross-section over its radial length. Each blade is slightly pitched about its longitudinal axis; its longer rectangular side forming an acute angle of pitch with the horizontal in such a way that, seen in the direction of rotation, the front edge of each blade is slightly higher than its rear edge. In plan view, the radial distance between the free ends of two opposite blades is equivalent to approximately half the maximum bowl diameter.

The foregoing and other aspects of the invention will become apparent from the following detailed description of the invention when considered in conjunction with the accompanying drawing figures. It is to be expressly understood, however, that the drawing figures are not intended as a definition of the invention but are for the purpose of illustration only.

BRIEF DESCRIPTION OF THE DRAWINGS

An embodiment of the invention, serving as an example, is represented in the drawing, in which.

DETAILED DESCRIPTION OF THE PREFERRED EMBODIMENTS

Figure 1:
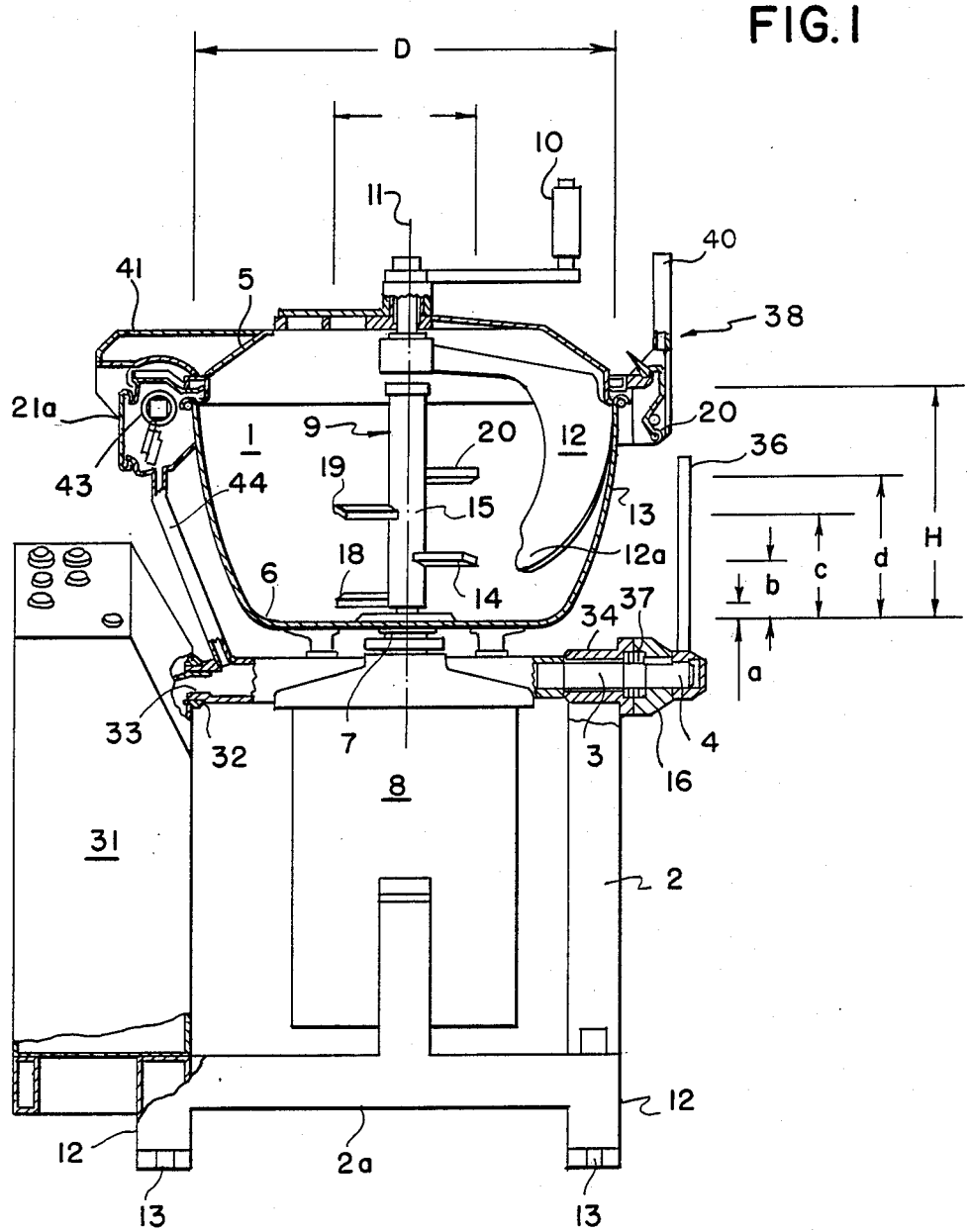
FIG. 1 shows, in front view and partly in longitudinal section, a universal kitchen appliance with a tool carrier.

The universal kitchen appliance shown in FIG. 1 consists of a bowl 1, which has a circular cross-section and is mounted in a supporting frame tiltably about a tilting shaft 3 arranged horizontally underneath its bowl bottom and can be arrested in the desired tilted position by a clamping lever 4. The bowl 1 has an upper closable lid 5 as well as a bowl bottom 6. A perpendicularly upward protruding tool shaft 7 is led centrally through the bowl bottom 6 and can be driven at high speed by a motor 8 arranged underneath the bowl bottom 6. On the tool shaft 7 there is fixed a chopping tool 9.

Shaft 7 is driven by motor 8. The motor is flanged onto the bottom of the bowl and located under the tilting shaft 3. Switching means for the motor 8 are housed laterally in a control box 31. The control box 31 is in the form of a stand for the bowl 1 and holds the bearing 32 for a first end of the tilting shaft 3. The shaft 3 is hollow and contains the electric lines 33 to the motor 8. The control box 31 is screwed together with the bottom part 2a of a support stand 2 and is therefore readily replaceable.

A second end of the tilting shaft 3 is bearingly supported in the upper end of support stand 2. The bottom part 2a of the support stand 2 has a plurality of feet 12 each having a roller 13.

The means for arresting the bowl 1 in a desired position comprise a first stationary toothed wheel 34 and a second toothed wheel 35 connected with tilting shaft 3. The toothed wheels may be brought into mutual engagement by displacing the tension lever 36 against the action of a spring 37.

The lid 5 has an eccentric toggle lock 38 including an easily-withdrawn, rotating axle 39 for supporting a manual lever 40. A first box hinge 21 is welded to the bowl lid 5. A first hinge 41 cooperates with a second box hinge 41a attached to the bowl 1. An electric cover device 43 is located in the second hinge. The electric lines of the device 43 are conducted through a water-tight electrical conduit 44 located outside the bowl 1, and into the hollow tilting shaft 3.

In the center of the bowl lid 5 there is mounted a transporting blade 12, which can be rotated about a perpendicular axis of rotation 11 by means of a hand crank 10, which extends almost up to the bowl wall 13 and which revolves with its lower free end 12a approximately on a level with a second blade 14 of the chopping tool 9. The bowl 1 has a maximum diameter D and a height H (without the bowl lid 5).

Figure 5:
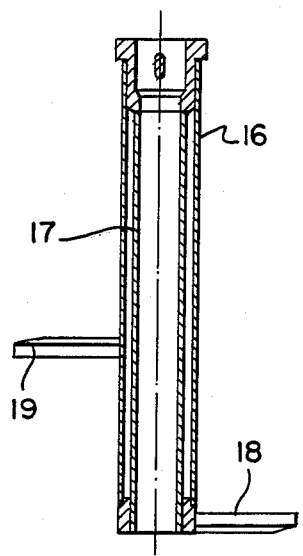
FIG. 5 shows a section according to the line V—V in FIG. 4.
Figure 6:
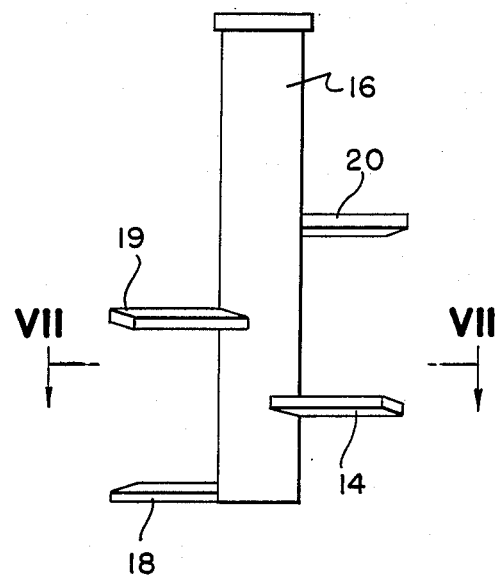
FIG. 6 shows the tool carrier according to FIG. 1.
Figure 7:
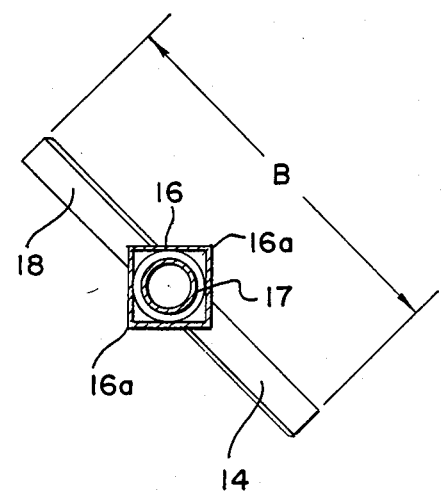
FIG. 7 shows a section according to the line VII—VII in FIG. 6.

The chopping tool 9 consists of a tool carrier 15, which is composed of a steel tube 16, which is square in cross-section, is fitted onto a round bushing 17 and welded to the ends of the latter (see FIGS. 5 and 7). The diagonal distance between two perpendicular edges 16a of the steel tube 16 is denoted by A.

Figure 2:
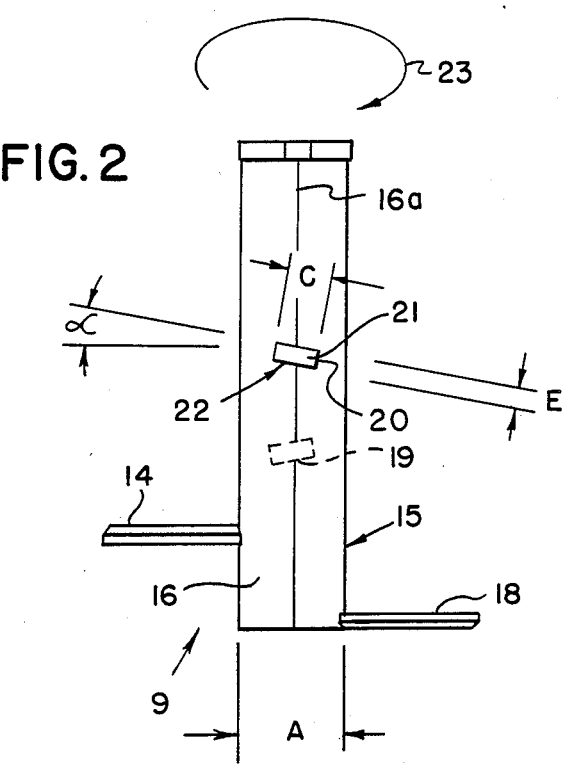
FIG. 2 shows, on an enlarged scale, the tool carrier according to FIG. 1, turned by about 90°.
Figure 3:
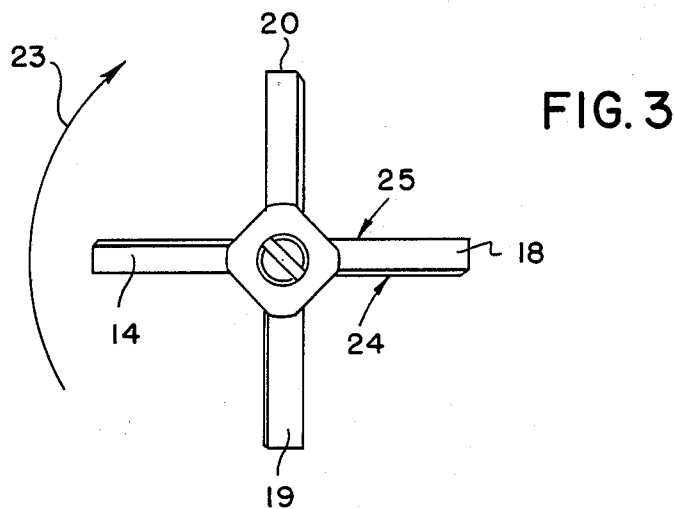
FIG. 3 shows the tool carrier according to FIG. 2 in a plan view.
Figure 4:
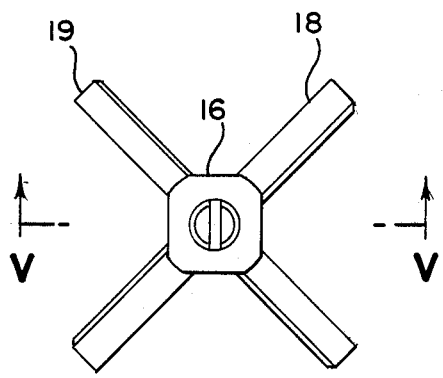
FIG. 4 shows, in a representation according to FIG. 3, the tool carrier turned by about 45°.

On the steel tube 16 there are fixed, in each case in the region of its perpendicular edges 16a, four blades 18, 14, 19 and 20, which extend radially outward, are mutually offset at 90° of circumference and in plan view form a cross, as can be seen in FIGS. 3 and 4. The four blades are designed equally long and have over their radial length a constant, flatly rectangular cross-section 21 (see FIG. 2). Each blade 14, 18, 19, 20 is slightly pitched (turned) about its longitudinal axis, its longer rectangular side 22 forming an acute angle of pitch, alpha, of 5°–15° with the horizontal in such a way that, seen in the direction of rotation 23, the front edge 24 of each blade is slightly higher than its rear edge 25.

Seen in plan view, the radial distance B between the free ends of opposite blades 18, 14 and 19, 20, respectively, is equivalent to 9/20 of the maximum bowl diameter D. The width C of each blade 14, 18, 19, 20 is approximately 3/10 of the diagonal edge distance A of the tool carrier 15. The thickness E of each blade is approximately 1/10 of the diagonal distance A.

The four blades are arranged in such a way that the two lower blades 18, 14 are mutually offset at 180°, just like the two higher blades, 19, 20 which are offset with respect to the two lower blades at 90°. Referring to the bowl bottom 6, the axial height, a, of the lowest blade 18 is 1/20 of the maximum container diameter D, the axial height, b, of the second blade 14 is 3/20 D, the axial height, c, of the third blade 19 is 5/20 D and the axial height, d, of the fourth blade 20 is 7/20 D, with an overall height of the bowl of 12/20 D.

It is expedient if the bowl has on its open upper side a closable bowl lid, in the center of which there is mounted a transporting blade, which can be rotated about a perpendicular axis by means of a hand crank or by motor, which extends almost up to the bowl wall and which revolves with its lower free end approximately on a level with the second blade.

The method of preparation is as follows:

Lean beef in 200–1,000 gram pieces is cured, seasoned and cooked in known cooking apparatus or cabinets until the pieces of meat have a relatively soft consistency. The pieces of beef thus prepared are introduced into the bowl of the kitchen appliance, adding stock if appropriate, and minced or shredded with the tool according to the invention at a speed of between 500 and maximally 1,800 rpm.

Due to the angle of pitch of each blade, a trumpet-shaped circulating movement of the mass of meat is produced within the bowl. To assist this circulating process, it is advantageous to operate the transporting blade. On smaller appliances, this may be performed manually by operation of the hand crank, but on larger appliances (bowl content up to 130 L) also by a geared motor. In any case, however, the transporting blade may only revolve at a substantially lower speed than the chopping tool.

Depending upon the degree of filling and the size of the appliance, the preparation process lasts between 30 seconds and 2 minutes. The corned beef mass is then ready for further chopping in the warm state.

What is claimed is:

1. A kitchen appliance for the mincing or shredding of food, comprising:
   (a) an upwardly open bowl of substantially round cross-section with a bowl bottom;
   (b) an upwardly protruding tool shaft perpendicular to the center of the bowl bottom and driven at high speed by a motor arranged underneath the bowl bottom; and
   (c) on the tool shaft there is fixed a chopping tool having four radially outwardly extending blades mutually offset at 90° of circumference, which in plan view form a cross; the blades arranged at different axial heights, the lowest blade revolving directly above the bowl bottom and the highest blade revolving at approximately ⅞ of the bowl height (H); each blade having a constant flatly rectangular cross-section over its radial length; each blade being slightly pitched about its longitudinal axis, its longer rectangular side forming an acute angle of pitch (alpha) with the horizontal in such a way that, seen in the direction of rotation, the front edge of each blade is slightly higher than the rear edge thereof; and in plan view, the radial distance (B) between the free ends of two opposite blades, is equivalent to approximately half the maximum bowl diameter (D).

2. A kitchen appliance according to claim 1, wherein the two lower blades and the two higher blades are mutually offset at about 180°.

3. A kitchen appliance according to claim 1, wherein the four blades have the same radial length.

4. A kitchen appliance according to claim 1, wherein the axial heights of the four blades above the bowl bottom, relative to the maximum bowl diameter (D) are 1/20, 3/20, 5/20 and 7/20 with a bowl height (H) of 12/20 of the bowl diameter (D).

5. A kitchen appliance according to claim 1, wherein in plan view, the radial distance (B) between the free ends of the mutually opposite blades is 9/20 of the maximum bowl diameter (D).

6. A kitchen appliance according to claim 1, wherein the angle of pitch is from about 5° to about 15°.

7. A kitchen appliance according to claim 1, wherein the blades are fixed on a tool carrier approximately square in cross-section.

8. A kitchen appliance according to claim 7, wherein the blades are in each case fixed in the region of a perpendicular edge of the tool carrier.

9. A kitchen appliance according to claim 7, wherein the width (C) of each blade is approximately 3/10 of the diagonal edge distance (A) of the tool carrier.

10. A kitchen appliance according to claim 7, wherein the thickness (E) of each blade is approximately 1/10 of the diagonal edge distance (A) of the tool carrier.

11. A kitchen appliance according to claim 1, wherein the tool carrier comprises a steel tube, which is square in cross-section, is fitted onto a round bushing and is attached to the ends of the latter.

12. A kitchen appliance according to claim 1, wherein the bowl has on its open upper side a closable bowl lid, in the center of which there is mounted a transporting blade, which can be rotated about a perpendicular axis by means of a power source, which extends almost up to the bowl wall and which revolves with its lower free end approximately on a level with the second blade.

13. A kitchen appliance according to claim 1, wherein the blades revolve at a speed of between 500 and 1,800 rpm.

14. A kitchen appliance according to claim 12, wherein the speed of the transporting blade is substantially lower than that of the four blades.

15. A kitchen appliance, comprising:
   a bowl with a generally circular cross-section, and including a bottom and a top;
   a hollow tilting shaft having opposite ends, disposed horizontally beneath the bottom of the bowl, connected with the bowl and functioning to tip the bowl;

a support stand supporting the second end of the tilting shaft;

a closable lid for closing the top of the bowl;

blade means for processing food disposed within the bowl;

a drive motor for driving the blade means, connected to the bottom of the bowl and disposed beneath the tipping means;

a control box integral with the support stand and supporting an end of the tilting shaft;

a plurality of electric lines from the motor to the control box, disposed in the tilting shaft;

a bearing rotatably supporting the opposite ends of the tilting shaft;

an upwardly protruding tool shaft perpendicular to the center of the bowl bottom and driven by the drive motor; and wherein the blade means include four radially outwardly extending blades mutually offset at 90° of circumference, which in plan view form a cross; the blades arranged at different axial heights, the lowest blade revolving directly above the bowl bottom and the highest blade revolving at approximately $\frac{3}{4}$ of the bowl height (H); each blade having a constant flatly rectangular cross-section over its radial length; each blade being slightly pitched about its longitudinal axis, its longer rectangular side forming an acute angle of pitch (alpha) with the horizontal in such a way that, seen in the direction of rotation, the front edge of each blade is slightly higher than the rear edge thereof; and in plan view, the radial distance (B) between the free ends of two opposite blades, is equivalent to approximately half the maximum bowl diameter (D).

* * * * *